UNITED STATES PATENT OFFICE 2,077,575

AZO DYES AND THEIR PRODUCTION

Mordecai Mendoza, Blackley, Manchester, England, assignor to Imperial Chemical Industries Limited, a corporation of Great Britain No Drawing. Application April 23, 1934, Serial No. 722,043. In Great Britain April 24, 1933

17 Claims. (Cl. 260—76)

According to the present invention I manufacture new azo dyes particularly suitable for dyeing leather by combining one or more diazotized amines with catechin (the crystalline principle of catechu or cutch), the amine or amines being so chosen as to contain one or more sulphonic, carboxylic or other groups sufficient to render the resulting dye easily soluble in water.

Also according to the invention I make further new leather dyes by taking such of the dyes obtained by the process of the preceding paragraph as are obtained by using one or more diazotized o-aminohydroxy or o-aminocarboxy compounds and convert them into complex metallic derivatives by treatment according to known methods of forming complexes from prior art dyes, it being my discovery that these methods are applicable to the new dyes herein disclosed, and that new and valuable compounds result from the application of said processes thereto.

I find that catechin is capable of combining with three equivalents of a diazo component, but the dyestuffs prepared by coupling with two equivalents have the more satisfactory properties as regards shade, affinity, levelling and penetration.

The following examples in which the parts are by weight, illustrate but do not limit the invention.

*Example 1.*—The diazo solution obtained in the customary manner from 34.6 parts of metanilic acid is allowed to flow with stirring into a suspension obtained by dissolving 36.2 parts of hydrated catechin (containing four molecules of water of crystallization and melting at 96° C.) or 30.8 parts of hydrated catechin (containing one molecule of water of crystallization and melting at 176–177° C.) or 29 parts of anhydrous catechin M. P. 176–177° C.) in 400 parts of water at 80° C. and allowing to cool to 10° C. Coupling takes place with formation of a bright orange solution and is complete in about one hour. The dyestuff may be isolated by addition of common salt or by evaporation to dryness. The coupling may be effected equally well in alkaline medium. When dried and ground the new dyestuff forms a reddish-brown powder extremely soluble in water to a yellow solution. It yields very level full yellow shades, when dyed on vegetable tanned skiver and chrome tanned calf. Similar shades are obtained by brush staining hide. The dyeings are fast to light.

The dyestuff has the formula

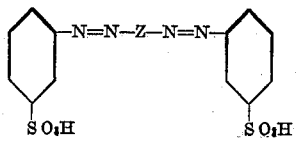

where Z stands for the residue of catechin. On reduction with tin and hydrochloric acid it yields metanilic acid and diamino-catechin.

If in the above combination metanilic acid is replaced by the equivalent amounts of (a) sulphanilic acid, (b) naphthionic acid, (c) picramic acid, the shades produced on leather are yellow, brown and deep red-brown respectively. All of these new products show very good solubility in water and all yield very level shades of good fastness on leather.

*Example 2.*—Under the conditions of Example 1 an azo compound is prepared using the same amount of catechin and the diazo solution from 9.3 parts of aniline. The product is a bright orange suspension. When combination is complete 45 parts of calcined sodium carbonate are added followed by the diazo solution obtained by diazotizing 23.3 parts of 3-amino-5-sulphosalicylic acid. The second combination is complete after stirring for about 12 hours and a dark brown solution is obtained from which the dyestuff is isolated by adding common salt after neutralizing with hydrochloric acid. It yields yellow-brown shades. On mordant chrome gloving leather the dyeings possess excellent fastness to washing.

The dyestuff has the formula

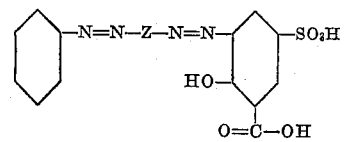

where Z stands for the residue of catechin. On reduction with tin and hydrochloric acid it yields aniline, 3-amino-5-sulphosalicylic acid and diaminocatechin. When sulphanilic acid replaces the aniline in the above combination a dyestuff of greater solubility and yielding brighter shades on leather is obtained.

*Example 3.*—To a disazo combination prepared as in Example 2 sufficient hydrochloric acid is added to make the reaction neutral to litmus. A solution of 25 parts of crystalline copper sulphate in 100 parts of water is then added and the mixture is raised to the boil, for one hour. It is then allowed to cool and the new copper containing dyestuff is isolated by addition of common salt. It yields very level brown shades on leather of excellent fastness to light and washing.

*Example 4.*—A neutral suspension of 29.5 parts of the mononitrated diazo oxide obtainable from 1-amino-2-hydroxynaphthalene-4-sulphonic acid is stirred at 10° C. into a solution of 36.2 parts of hydrated catechin (containing 4 molecules of water of crystallization) or the equivalent amount of the other forms of catechin in 400 parts of water and 45 parts of calcined sodium carbonate. After stirring for about 4 hours there is added the solution of the diazo compound from 18.9 parts of 2-aminophenol-4-sulphosalicyclic acid in 400 parts of water and stirring is maintained at about 15° C. for a further 12 hours. The mixture is neutralized by means of hydrochloric acid, a solution of 25 parts of copper sulphate crystals in 100 parts of water is added and the mixture is boiled under reflux condenser for 10 hours. It is then allowed to cool to laboratory temperature and the new copper-containing dyestuff is finally isolated by acidifying until definitely mineral acid in reaction, and adding common salt. It gives level chocolate brown shades on leather of excellent fastness to light and washing.

The dyestuff has the formula

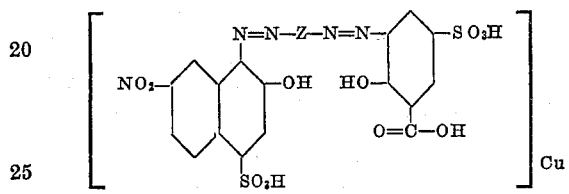

where Z stands for the residue of catechin. On reduction with tin and hydrochloric acid it yields a diaminonaphtholsulphonic acid, 3-amino-5-sulphosalicylic acid, and diaminocatechin.

*Example 5.*—18.9 parts of 2-aminophenol-4-sulphonic acid in 400 parts of water are diazotized in the customary manner by means of 6.9 parts of sodium nitrite and 27.5 parts of hydrochloric acid (20%) and the diazo solution is coupled at 10° C. to a solution of catechin as in Example 4. After stirring for 2 hours there is added the solution of the diazo compound from 23.3 parts of 3-amino-5-sulphosalicylic acid. The second combination is completed in the course of 12 hours. The finished coupling is then neutralized by means of hydrochloric acid, a solution of 12 parts of the enneahydrate of chromium-fluoride in 80 parts of water is added and the mixture is boiled under reflux for 10 hours. On cooling to laboratory temperature the new chromium containing dyestuff is isolated by means of common salt. It dyes leather in level chocolate brown shades of excellent fastness to light and washing.

*Example 6.*—A neutral suspension of 50 parts of the diazo oxide obtainable from 1-amino-2-hydroxynaphthalene-4-sulphonic acid is stirred at 10° C. into a solution of 36.2 parts of hydrated catechin in 400 parts of water containing 45 parts of calcined sodium carbonate as in Example 1. Coupling is allowed to complete in the course of 12 hours. The reaction of the coupling solution is then made neutral by addition of hydrochloric acid and a solution of 18 parts of the enneahydrate of chromium fluoride in 100 parts of water or the equivalent amount of another soluble chromium salt is added. The mixture is then boiled under reflux condenser for a further 12 hours. On cooling to ordinary temperature the new chromium complex is precipitated by addition of common salt. It is filtered off, dried and ground. It is a very dark grey powder, readily soluble in water to a reddish-blue solution. It dyes leather in level grey shades of excellent fastness to light and washing.

*Example 7.*—29.5 parts of the mononitrated diazo oxide obtainable from 1-amino-2-hydroxynaphthalene-4-sulphonic acid are stirred at 10° C. into a solution of 36.2 parts of hydrated catechin (containing 4 molecules of water of crystallization) or the equivalent amount of another form of catechin in 400 parts of water and 20 parts of calcined sodium carbonate. Coupling is complete in about 4 hours and the new dyestuff is precipitated from the neutralized coupling solution by means of common salt. When dry it is a dark brown powder readily soluble in water, yielding chocolate-brown shades on vegetable tanned skiver and chrome calf of fairly good fastness to light. The chromium complex of this dyestuff is readily obtained if to the neutralized coupling solution is added a solution of 9 parts of the enneahydrate of chromium fluoride (or the equivalent amount of another soluble chromium salt) in 30 parts of water and the mixture is boiled under reflux condenser for about 10 hours. When cool, the chromium complex may be salted out from the solution. It dyes leather in greyish-purple shades of excellent fastness to light and washing.

*Example 8.*—To the uncoppered disazo combination prepared as in Example 4 a further 20 parts of calcined sodium carbonate are added followed by the diazo solution obtained by diazotizing 23.3 parts of 3-amino-5-sulphosalicylic acid in the customary manner. Coupling is allowed to proceed to completion over a further 12 hours and the solution is then neutralized with hydrochloric acid. A solution of 27 parts of the enneahydrate of chromium fluoride in 120 parts of water is added and the mixture is boiled under reflux condenser for 10 hours. After cooling, the new chromium complex is precipitated by means of common salt. It dyes leather in violet-brown shades of excellent fastness to light and washing.

I claim,

1. Process for the manufacture of new azo dyes which comprises coupling catechin with at least one and not more than three molecular proportions of aromatic diazo compounds, at least one of which contains at least one water-solubilizing group in the molecule.

2. Process for the manufacture of new azo dyes which comprises coupling catechin with two molecular proportions of aromatic diazo compounds, at least one of which contains at least one water-solubilizing group in the molecule.

3. Process for the manufacture of new azo dyes which comprises coupling catechin with approximately two molecular proportions of a diazobenzene-sulphonic acid.

4. Process for the manufacture of a new azo dye which comprises coupling catechin with approximately two molecular proportions of diazotized metanilic acid.

5. Process for the manufacture of new azo dyes which comprises coupling catechin with at least one and not more than three molecular proportions of aromatic diazo compounds, at least one of which contains in its molecule at least one water-solubilizing group, and the resulting dye contains at least one hydroxyl group in ortho position to an azo grouping.

6. Process for the manufacture of new azo dyes which comprises coupling catechin with approximately one molecular proportion of an o-hydroxydiazobenzenesulphonic acid and approximately one molecular proportion of an aromatic diazo compound.

7. Process for the manufacture of new azo dyes which comprises coupling catechin with approximately one molecular proportion of a o-hydroxydiazonaphthalenesulphonic acid and approximately one molecular proportion of an aromatic diazo compound.

8. A new azo dye of the formula

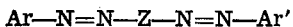

where Ar and Ar' stand for one of a group consisting of radicals of the benzene and naphthalene series carrying, between them, at least one water-solubilizing substituent group, and Z stands for the radical of catechin.

9. A new azo dye of the formula

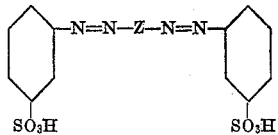

where Z stands for the catechin radical, the said dye being a water-soluble red brown powder, dyeing yellow shades on vegetable-tanned skiver and chrome-tanned calf, and yielding, on reduction with tin and hydrochloric acid, metanilic acid and diaminocatechin.

10. A new azo dye of the formula

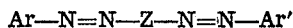

where Ar stands for an aryl radical of the group consisting of the benzene or naphthalene series, Ar' stands for a hydroxysulphoaryl group of the benzene or naphthalene series, and Z stands for the radical of catechin.

11. A new azo dye of the formula

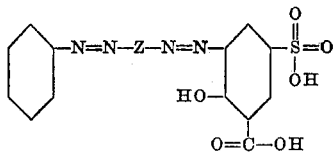

where Z stands for the radical of catechin, the said dye being a water-soluble brown powder giving yellowish brown shades on leather, and yielding on reduction with tin and hydrochloric acid aniline, 3-amino-5-sulphosalicylic acid and diaminocatechin.

12. A new azo dye of the formula

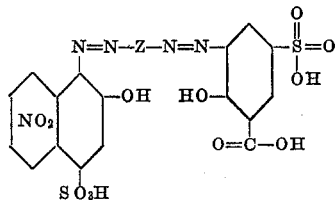

where Z stands for the radical of catechin, the said dye being a water-soluble brown powder, giving on reduction with tin and hydrochloric acid a diaminonaphtholsulphonic acid, 3-amino-5-sulphosalicylic acid, and diaminocatechin.

13. A compound substantially identical with that formed by coupling catechin with a diazotized primary arylamine having at least one water-solubilizing nuclear substituent.

14. The method which comprises coupling a diazotized arylamine to catechin and coupling diazotized 3-amino-5-sulfosalicyclic acid to the resulting compound.

15. A compound having the formula

in which Z is the radical of catechin, R and R' are radicals of diazotized aromatic primary amines.

16. A compound represented by the formula

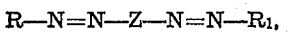

in which Z is the radical of catechin, R is the radical of a diazotized aromatic primary amine free from hydroxyl groups and $R_1$ is the radical of a diazotized aromatic primary amine having an hydroxyl group ortho to the amino group.

17. A compound represented by the formula

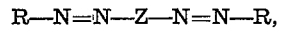

in which Z is the radical of catechin and R is an ortho-amino-hydroxy compound.

MORDECAI MENDOZA.

Certificate of Correction

Patent No. 2,077,575. April 20, 1937.

MORDECAI MENDOZA

It is hereby certified that error appears in the printed specification of the above-numbered patent requiring correction as follows: Page 2, first column, lines 20 to 25 inclusive, for that portion of the formula reading

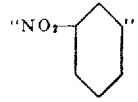

read

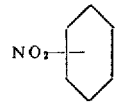

and that the said Letters Patent should be read with this correction therein that the same may conform to the record of the case in the Patent Office.

Signed and sealed this 20th day of July, A. D. 1937.

[SEAL]

HENRY VAN ARSDALE,
*Acting Commissioner of Patents.*